(No Model.)
P. FYFE.
WHEEL FOR ROAD VEHICLES.
No. 558,796. Patented Apr. 21, 1896.
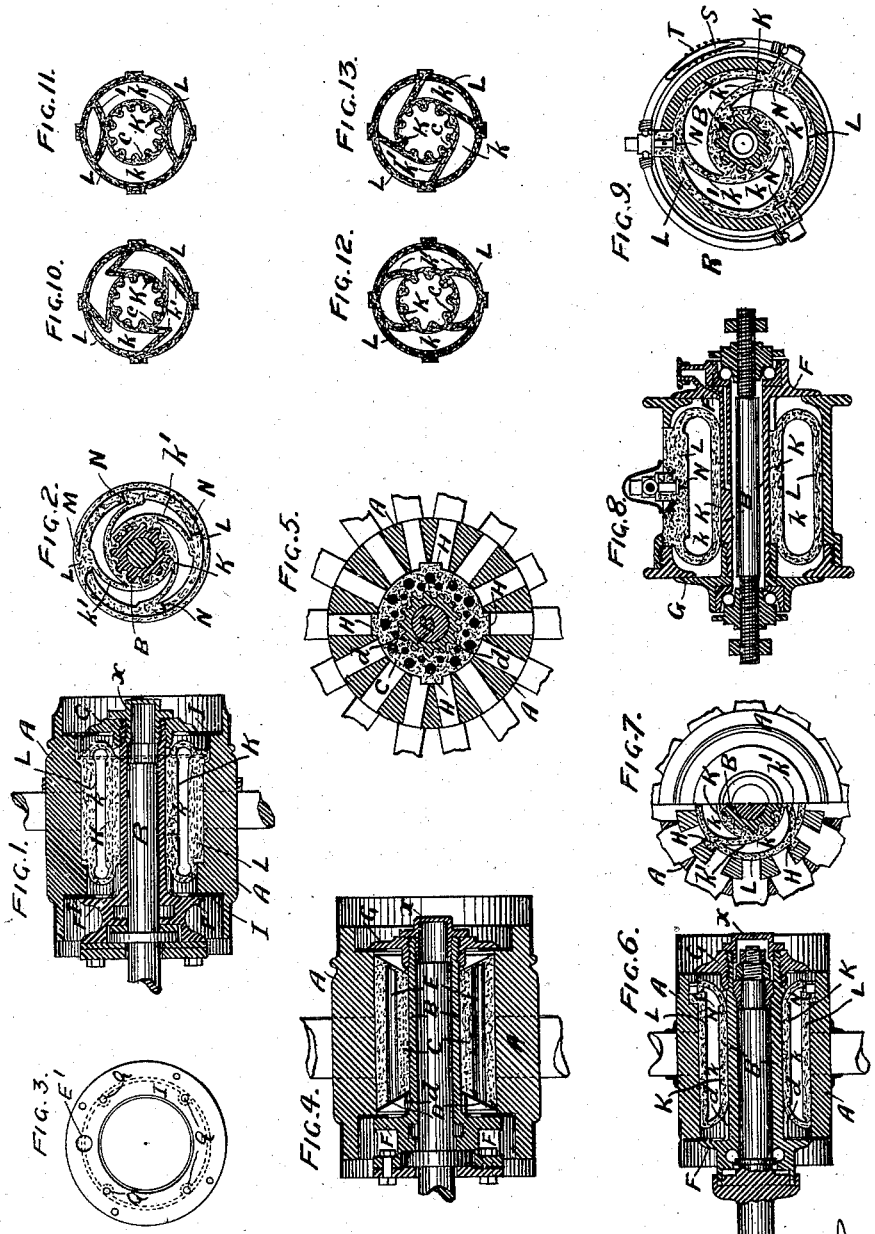
Witnesses
H. van Oldenneel
E. A. Scott
Inventor
Peter Fyfe
by
Attorneys

UNITED STATES PATENT OFFICE.

PETER FYFE, OF GLASGOW, SCOTLAND.

WHEEL FOR ROAD-VEHICLES.

SPECIFICATION forming part of Letters Patent No. 558,796, dated April 21, 1896.

Application filed October 23, 1895. Serial No. 566,648. (No model.)

*To all whom it may concern:*

Be it known that I, PETER FYFE, engineer, a citizen of the United Kingdom of Great Britain and Ireland, residing at 1 Montrose Street, in the city of Glasgow, Scotland, have invented certain new and useful Improvements in Wheels for Road-Vehicles, of which the following is a specification.

This invention has for its object to obviate the vibration communicated to road-vehicles such as carriages and omnibuses by the passage of the wheels over rough roadways, while avoiding the use of pneumatic or similar expensive tires, which are unsuitable for heavy vehicles. To that end I form the wheel with an elastic or resilient hub of improved construction, which prevents the transmission of vibration from the wheel-nave to the axle and thence to the body of the vehicles.

The invention is illustrated under several modifications by the accompanying drawings.

Figure 1 is a longitudinal vertical section of a wheel-hub with "Mail" axle constructed in accordance with my invention. Fig. 2 is a transverse section of same, and Fig. 3 is a view of a portion of the hub hereinafter particularly referred to. Figs. 4 and 5 are respectively longitudinal and transverse sections of a modification of a wheel-hub; and Figs. 6 and 7 are longitudinal and cross vertical sections of another modification of the wheel-hub, showing its application in a "Warner" wheel with the "Collinge" axle. Figs. 8 and 9 are longitudinal vertical and transverse sections, respectively, of the hub as applied to a bicycle; and Figs. 10, 11, 12, and 13 show various sections of the pneumatic sleeve.

In carrying out the invention I form the wheel nave or hub A of wood or other material, between which and the axle-bush B, I secure a sleeve C, which is made hollow and inflated, as shown at Figs. 1 and 2, or it may be formed of solid rubber, cored, as shown at Figs. 4 and 5, or cored out in any other form, end pieces D being solutioned onto the sleeve C to inclose the air-spaces E in the latter case. The rubber sleeve C is passed over the axle-bush B, the bush B being held on at its opposite end by a flanged nut G, screwed onto the end of the bush. The flanged nut is locked in position by the screwed oil-cup *x*.

To prevent creeping or circumferential slipping of the rubber sleeve C on the axle-bush B the latter is fluted or has projections *d* on it entering recesses *c* in the sleeve, and similar provision is made, as at H, between the wheel-nave and the rubber sleeve or lining C. An annular metallic plate I is fitted on each side of the nave A, in rubbing contact with which and just bearing are the flange F of the axle-bush B at one end and a flanged nut G at the opposite end. This arrangement, while preventing rocking of the wheel on its axle-box, permits the free movement of the axle-box as the wheel suddenly rises and falls because of the inequalities of the road or street.

When the sleeve C is made hollow, it is composed, as shown by Figs. 1 and 2, of an inner and outer shell K L, inclosing air under pressure, the air-space being divided into a number of separate chambers *k* by means of webs or partitions *k'*, which are preferably made tangential to the periphery of the inner shell K, the better to take up the torsional strain, but which may be made of sinuous, V, or cup shape, or other like shape in section—such, for example, as shown at Figs. 10, 11, 12, and 13—being such as will not interfere with the free cushioning action of the sleeve, while providing sufficient strength to take up the torsional strain necessary to revolve the bush on the axle.

All the chambers *k* of the air-space in the wheel-nave may be inflated simultaneously at an equal pressure by applying an air-pump at the inlet to an air-passage M, having connecting branch passages N to supply air to the several chambers or cells *k*. These passages may be formed in the end of the sleeve, as shown at Figs. 1 and 2, or they may be external to it, as shown at Figs. 8 and 9. A screw-down or other valve or cap may be fitted to shut off communication between the air-passages N and the atmosphere. The ends of the sleeve may be of semicircular or other suitable section, such as is shown, and may be covered over with a leather covering solutioned on, in order to prevent damage to the rubber by any oil which might chance to find access to the outside of the axle-bush.

Fig. 3 is an elevation of an annular metallic ring I, against which the flange of the axle-bush B bears. An orifice E' is provided in the ring to permit of access to the valve or inlet nozzle N, the said orifice being subsequently plugged. Set-screws Q are fitted in the ring I, which, when the chambers $k$ have been inflated, are tightened up and bear on various points of the air-passage M in order to close off communication between the various chambers $k$.

Figs. 8 and 9 represent the improved hub as applied to a bicycle, each of the compartments $k$ of the air-chamber being adapted to be inflated simultaneously by the use of the tube R. (Shown in Fig. 9.) In the length of this tube R, between each compartment $k$, a wire S, having its ends tapered, is fitted, which allows the air to pass during inflation and also provides a means of closing up the tubes by wires T at these points to prevent egress of air from one chamber to the other, which would destroy the full cushioning action.

Having now described the invention, what I claim, and desire to secure by Letters Patent, is—

1. In combination with the hub, a hollow sleeve divided into a series of air-containing compartments, and means for closing the said compartments independently, substantially as described.

2. In a wheel for road-vehicles an elastic or resilient hub composed of rubber cored out and having end pieces inclosing and separating the air-spaces substantially as described.

3. In a wheel for road-vehicles an elastic hub or sleeve composed of an outer and inner shell divided by webs tangentially connecting the shells the space between the webs and shells constituting independent air-chambers substantially as and for the purpose set forth.

4. In combination, the hub, the bush, the elastic sleeve interposed between the hub and bushing, the end plates I and the collars F, G, bearing on the plates I, the said sleeve being within the plates I and having air-compartments therein, substantially as described.

5. In combination, the hub, the bush, the sleeve interposed between them and having a series of compartments extending longitudinally of and parallel to the axis of the hub, and means at the end of the sleeve for closing the longitudinal air-chambers from each other, substantially as described.

Signed at Glasgow this 25th day of September, 1895.

PETER FYFE.

Witnesses:
WALLACE FAIRWEATHER,
JNO. ARMSTRONG, Jr.